(No Model.)
2 Sheets—Sheet 2.
W. G. COLLIER.
WEIGHING SCALE.
No. 281,753. Patented July 24, 1883.
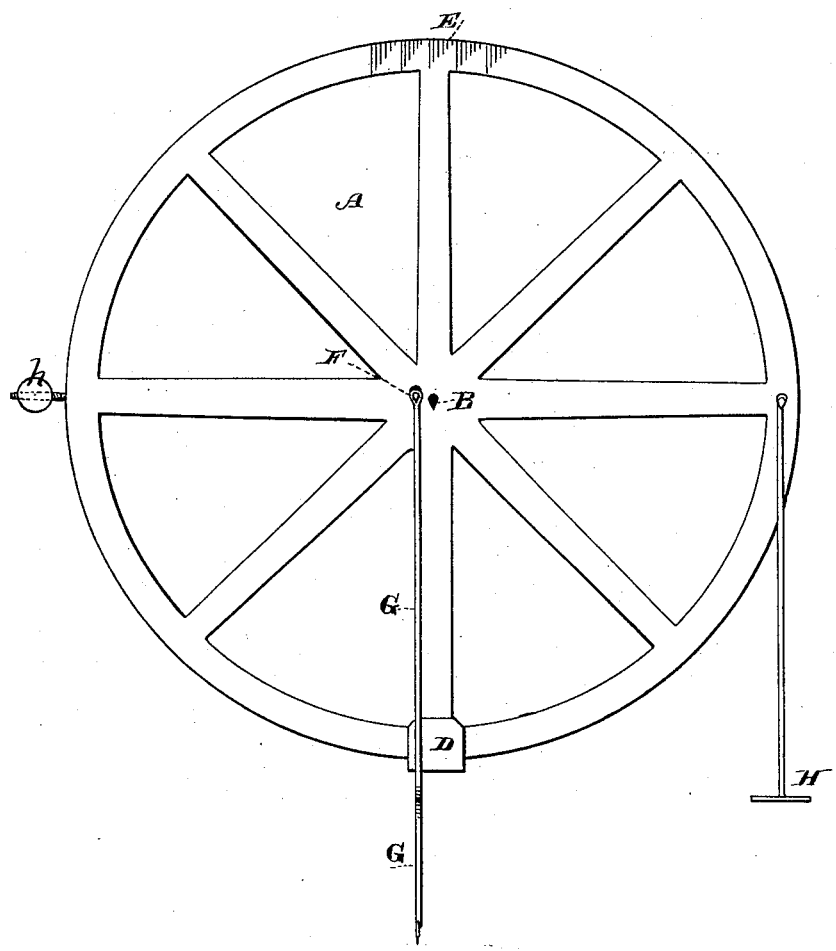
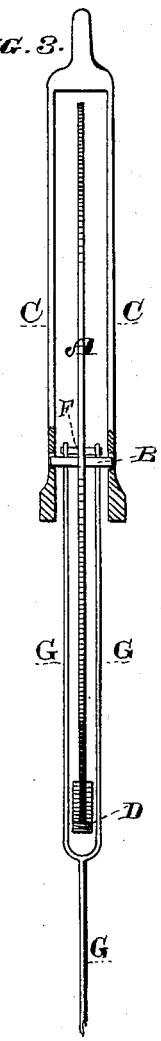

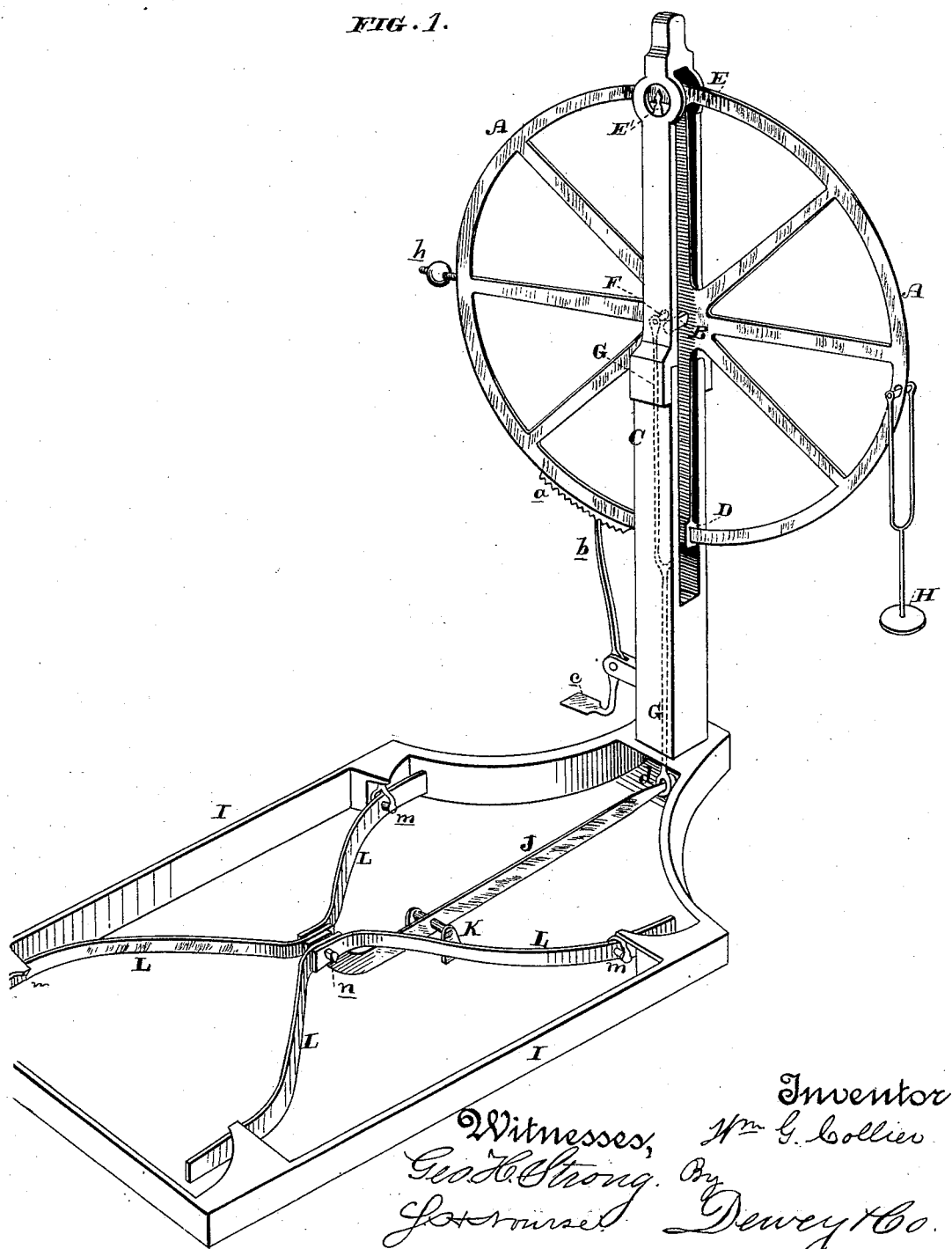

UNITED STATES PATENT OFFICE.

WILLIAM G. COLLIER, OF MERCED, CALIFORNIA.

WEIGHING-SCALE.

SPECIFICATION forming part of Letters Patent No. 281,753, dated July 24, 1883.

Application filed December 12, 1882. (No model.)

*To all whom it may concern:*

Be it known that I, WILLIAM G. COLLIER, of Merced, county of Merced, State of California, have invented an Improved Weighing-Scale; and I do hereby declare the following to be a full, clear, and exact description thereof.

My invention relates to certain improvements in scales for weighing purposes; and it consists of a circular self-balanced rim having arms and a central hub with central knife-edge pivot upon which it may oscillate. The article to be weighed is suspended from a pivot at a short distance horizontally from the knife-edge supports, and a permanent counterbalance-weight is fixed to the rim beneath the knife-edge fulcrum, with a corresponding index or scale at any convenient part of the rim, so that all weights, within a certain amount, will be balanced by the movement of a counter-weight at nearly right angles away from a vertical line through the point of suspension, and indicated by the scale. Weights above this amount are counterbalanced by disks of fixed values suspended from a point on the rim in a horizontal line with the fulcrum and point of suspension of the weight, these disks being their own registers of what they counterbalance, while the intermediate weights above this amount will be indicated, as before stated, upon the scale, so as to enable the operator to ascertain all weights, within certain limits, without being obliged to move the counterbalance-weights for each change. A pawl engages a rack upon the rim and holds the indicator at the proper point for each weight until released. In connection with this mechanism I employ an improved system of platform-levers, which are connected with the weight, suspending arm, and by which error of motion is overcome.

Referring to the accompanying drawings for a more complete explanation of my invention, Figure 1 is a perspective view of my apparatus. Fig. 2 is a side elevation, showing the levers. Fig. 3 is an end view.

A is a rim of any suitable diameter—as two or three feet—having a central hub and light arms for rigidity. Upon each side of the hub the knife-edge fulcrums B project and rest in supports in the standards C, or upon a forked rod, by which this part of the device may be suspended for simple weighing, so that the rim may oscillate or turn upon them as far as is necessary in weighing. A counterbalancing-weight, D, is fixed permanently to the rim, at the lowermost part, beneath the fulcrum, and a scale, E, may be marked upon the rim at the top, or at any desired point, with a suitable indicator, E', to show at a glance the weight of the object to be weighed. This scale is preferably made, as shown, with lines of gradually-increasing length to mark the fourth, half, three-fourths, and pound, or other divisions, so that they may be readily observed and correctly noted.

At one side of the fulcrum, and slightly above a horizontal line through it, the supports F project, and the suspension-rods G for the weight are attached to these supports.

The counter-balance D is of such a weight that it may serve to weigh anything up to a hundred pounds by its deflection from a vertical line. This deflection is comparatively small, and while the graduated scale upon the rim may be made very accurate and minute, the movement of the weight-support F is so small that there will be no error by reason of its slight departure from a vertical line. By this construction the weight of any article less than one hundred pounds will be at once indicated upon the scale, and no counterpoise-weights need be moved or adjusted for the purpose.

In order to hold the wheel at the point to indicate the weight and prevent vibration, the rim may be serrated at any point, as at *a*, and a pawl, *b*, so fixed as to engage and hold it at the point to which it is deflected by the weight until the scale can be read, after which it may be released by a foot or other lever, *c*.

In order to weigh articles above one hundred pounds, small disks or counterbalance-weights are placed upon the plate H, which is properly suspended on knife-edge bearings upon the periphery of the rim, in a line which passes horizontally through the fulcrum and weight-support. Suitable counterpoise-weights are placed upon this plate, these weights indicating twenty-five, fifty, one hundred, or any desired number of pounds, which they themselves will always register, while any intermediate number of pounds above those indicated by the weight will be seen by a glance upon the scale upon the rim.

$h$ is an adjusting-counterpoise, which is fixed to the side of the rim opposite the suspended weight-holder H, as shown.

I is the frame of the platform, upon which the article to be weighed is placed.

J is a lever, having its fulcrum at K, and the end of its long arm connected with the suspension-rod G of the scale at $d$.

Four lever-arms, L, have their fulcrums at the corners of the frame I, as shown at $m$, and are so curved that the ends of their long arms are connected at $n$ with the short arm of the lever J, which is curved upward, as shown, for that purpose. The short arms of these levers L project beyond the fulcrums $m$, and are fitted to support the corners of the platform, thus making them all levers of the first class. By this construction and the curvature of the short arm of the lever J any error which might be caused by the approach of one end of a lever to the fulcrum by the movement in an arc will be corrected by a corresponding movement of the opposite end, and this principle is observed throughout the apparatus. By the use of the circular rim with arms this portion will be in equilibrium in whatever position it may be placed, and will produce no error by its change of position. It will be obvious that this result would be produced if equal segments were removed from the rim between the arms, as the remainder would still be in equilibrium.

The movements of the weight and counter-weights about the fulcrum being made to compensate each other, the apparatus will be correct for all weights and in all positions.

The suspending-points F and the support for the weight-disk H are so placed that their whole movement is made, respectively, half above and half below a horizontal line taken through the fulcrum, and this gives the least possible error from this cause.

I am aware that weighing devices have been constructed in which a weight moves around a fulcrum so as to approach a horizontal position, while the article to be weighed is suspended from a short arm of the lever having notches at different distances from the fulcrum, and I do not claim such a construction.

Having thus described my invention, what I claim as new, and desire to secure by Letters Patent, is—

1. The circular self-balanced rim A, with its fulcrum B, scale E, rigidly-fixed counterweight D, and the weight-suspending rods G, in combination with the rack $a$ upon the rim, and the pawl $b$, substantially as herein described.

2. The circular self-balanced rim A, with its fulcrum B, scale E, fixed counter-weight D, and adjustable weight-carrier H, in combination with the platform-supporting levers L and the lever J, substantially as herein described.

3. In combination, with the self-balanced rim A, with its fulcrum B, scale E, weight-suspending rods G, and fixed counter-weight D, the platform-supporting levers L, having the weight and power at opposite sides of their fulcrums, and the connecting-lever J, also of the first class, whereby errors caused by the movement around the fulcrums will be counteracted, substantially as herein described.

In witness whereof I hereunto set my hand.

WILLIAM G. COLLIER.

Witnesses:
S. H. NOURSE,
GEO. W. EMERSON.